(12) United States Patent
Engler et al.

(10) Patent No.: US 9,915,166 B2
(45) Date of Patent: Mar. 13, 2018

(54) GAS TURBINE AND METHOD FOR OPERATING THE GAS TURBINE

(71) Applicant: Siemens Aktiengesellschaft, Munich (DE)

(72) Inventors: Thorsten Engler, Moers (DE); Markus Gorynski, Bochum (DE); Manuel Gutermuth, Essen (DE); Philipp Kreutzer, Haltern am See (DE); Marco Link, Mulheim (DE); Nicolas Savilius, Essen (DE); Kai Suselbeck, Oberhausen (DE); Marc Tertilt, Hattingen (DE)

(73) Assignee: Siemens Aktiengesellschaft, Munich (DE)

( * ) Notice: Subject to any disclaimer, the term of this patent is extended or adjusted under 35 U.S.C. 154(b) by 345 days.

(21) Appl. No.: 14/777,319

(22) PCT Filed: Feb. 20, 2014

(86) PCT No.: PCT/EP2014/053312
§ 371 (c)(1),
(2) Date: Sep. 15, 2015

(87) PCT Pub. No.: WO2014/146854
PCT Pub. Date: Sep. 25, 2014

(65) Prior Publication Data
US 2016/0024960 A1    Jan. 28, 2016

(30) Foreign Application Priority Data
Mar. 20, 2013    (EP) .................................... 13160102

(51) Int. Cl.
*F01D 25/02*    (2006.01)
*F01D 17/16*    (2006.01)
(Continued)

(52) U.S. Cl.
CPC ............. *F01D 17/16* (2013.01); *F01D 9/041* (2013.01); *F01D 17/08* (2013.01); *F01D 17/085* (2013.01);
(Continued)

(58) Field of Classification Search
CPC ...... F01D 17/16; F01D 17/162; F01D 17/085; F01D 25/02; F01D 9/041; F02C 7/042; F02C 7/057
See application file for complete search history.

(56) References Cited

U.S. PATENT DOCUMENTS 2,756,596 A    7/1956    Nelson et al.
5,911,679 A    6/1999    Farrell et al.
(Continued)

FOREIGN PATENT DOCUMENTS

CN    1908405 A    2/2007
CN    101218430 A    7/2008
(Continued)

OTHER PUBLICATIONS

Sammak, Master Thesis—Anti-Icing in Gas Turbines, Feb. 2006, pp. 119-120.*
(Continued)

*Primary Examiner* — Woody Lee, Jr.
*Assistant Examiner* — Sabbir Hasan
(74) *Attorney, Agent, or Firm* — Beusse Wolter Sanks & Maire

(57) ABSTRACT

A gas turbine includes an intake tract and a compressor having a compressor flow channel. The compressor further includes an inlet guide vane row positioned in the compressor flow channel having inlet guide vanes that can be adjusted. The gas turbine has an icing sensor unit having at least one sensor arranged between a first compressor blade row and a first compressor guide vane row. The first com-
(Continued)

pressor blade row is thereby arranged in the compressor flow channel directly downstream of the inlet guide vane row, and the first compressor guide vane row is arranged directly downstream of the first compressor blade row. A method detects an imminent icing of the compressor, and the compressor is safeguarded therefrom such that at least inlet guide vanes of the inlet guide vane row are adjusted such that the acceleration of an intake air mass flow is reduced.

7 Claims, 2 Drawing Sheets

(51) Int. Cl.
  *F01D 17/08*  (2006.01)
  *F02C 7/057*  (2006.01)
  *F01D 9/04*  (2006.01)
  *F02C 7/04*  (2006.01)

(52) U.S. Cl.
  CPC ............... *F01D 25/02* (2013.01); *F02C 7/04* (2013.01); *F02C 7/057* (2013.01); *F05D 2220/32* (2013.01); *F05D 2240/12* (2013.01); *F05D 2270/301* (2013.01); *F05D 2270/303* (2013.01); *F05D 2270/311* (2013.01)

(56) References Cited

U.S. PATENT DOCUMENTS

| | | | |
|---|---|---|---|
| 6,226,974 B1 * | 5/2001 | Andrew | .................... F02C 9/28 60/772 |
| 6,364,602 B1 * | 4/2002 | Andrew | .................. F01D 21/10 415/1 |
| 2002/0106001 A1 | 8/2002 | Tomlinson et al. | |
| 2007/0031238 A1 | 2/2007 | Fujii et al. | |
| 2008/0061559 A1 | 3/2008 | Hirshberg | |
| 2009/0288420 A1 | 11/2009 | Grewe et al. | |

FOREIGN PATENT DOCUMENTS

| | | | |
|---|---|---|---|
| CN | 102094711 A | 6/2011 | |
| CN | 102900539 A | 1/2013 | |
| EP | 2128406 B1 | 1/2011 | |
| EP | 2466096 A1 * | 6/2012 | ............... F02C 6/08 |
| GB | 2124706 B | 5/1986 | |
| JP | 541709 A | 1/1979 | |
| JP | S541709 A | 1/1979 | |
| JP | 59054738 A | 3/1984 | |
| JP | S5954738 A | 3/1984 | |
| JP | S62148366 U | 9/1987 | |
| JP | S63248931 A | 10/1988 | |
| JP | H01053429 U | 4/1989 | |
| JP | S62148366 U | 4/1989 | |
| JP | 2002357320 A | 12/2002 | |
| JP | 2007040171 A | 2/2007 | |
| JP | 2009167904 A | 7/2009 | |
| JP | 2011032869 A | 2/2011 | |

OTHER PUBLICATIONS

Meggit EW 140 and DIC 413, Ice detection systems for gas turbines, Jun. 2011, p. 3.*
JP Office Action dated Sep. 26, 2016, for JP application No. 2016-503584.
JP Notice of Allowance dated Jan. 4, 2017, for JP patent application No. 2016-503584.

* cited by examiner

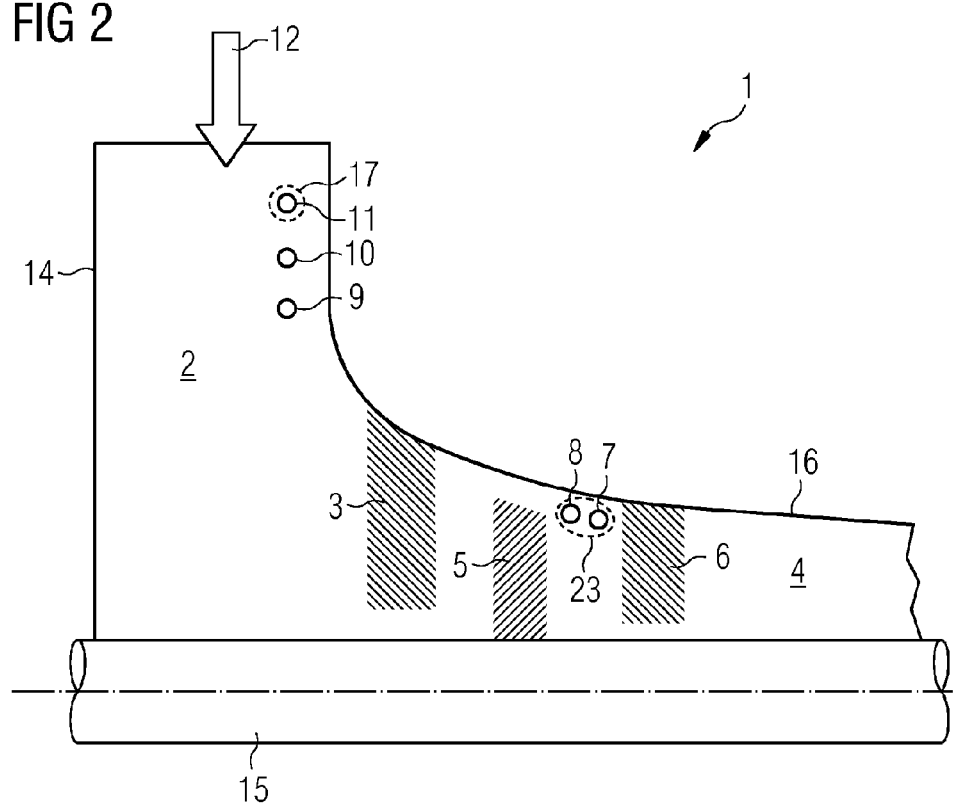
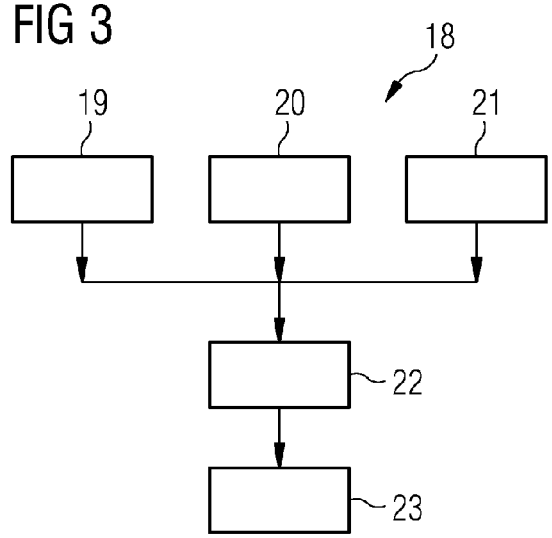

GAS TURBINE AND METHOD FOR OPERATING THE GAS TURBINE

CROSS REFERENCE TO RELATED APPLICATIONS

This application is the US National Stage of International Application No. PCT/EP2014/053312 filed Feb. 20, 2014, and claims the benefit thereof. The International Application claims the benefit of European Application No. EP13160102 filed Mar. 20, 2013. All of the applications are incorporated by reference herein in their entirety.

FIELD OF INVENTION

The present invention relates to a gas turbine and to a method for operating the gas turbine.

BACKGROUND OF INVENTION

A gas turbine is a combustion engine. It usually comprises a compressor, a combustion chamber and a turbine. During the operation of the gas turbine, air is initially compressed by means of blading of one or more compressor stages, then mixed with a gaseous or liquid fuel in the combustion chamber, ignited and burned. The air is also used for cooling. Thus there arises a mixture of combustion gas and air, referred to as hot gas, which is expanded in the subsequent part of the turbine. During this process, thermal energy is converted into mechanical energy. This mechanical energy first of all drives the compressor, while the remaining part is used, in particular, to drive a generator. A gas turbine of this kind is shown in EP 2 128 406 B1, for example.

In the case of gas turbines in part-load operation, adapting the compressor intake air mass flow by setting variable compressor inlet guide blades is a known practice. It is thereby possible to achieve a maximum efficiency with a given maximum exhaust gas temperature. Here, the permissible minimum position of the variable compressor inlet guide blades is limited inter alia by cooling of the intake air in the region of the inlet guide blade row and/or the first compressor rotor blade row and the associated risk of icing. Depending on the humidity of the intake air, the acceleration of the flow downstream of the inlet guide blade row, which leads to cooling of the flow, may result in icing in the compressor and hence to impairment of the integrity of the machine and possibly to damage to the machine.

SUMMARY OF INVENTION

Accordingly, it is a technical object to eliminate such disadvantages and to provide an improved gas turbine and a method for operating said gas turbine.

Approaches which can contribute to the achievement of this technical object can be found in the teaching of document JPS 63-248931, for instance, according to which a temperature sensor in the compressor flow duct downstream of the compressor inlet guide blade cascade determines the operating temperature and, with the aid of the temperature value thus determined, the gas turbine can be controlled in such a way that the likelihood of the occurrence of an icing event is reduced.

The two documents JP 2011-032869 A and EP 2 466 096 A1 furthermore teach the taking of a plurality of measured values in the intake flow duct upstream of the compressor inlet guide blade cascade and the use of said values as a basis for controlling the gas turbine. In this case, the temperature, the pressure and the air humidity of the intake air are determined by means of respective sensors provided for that purpose.

However, the disadvantage of these teachings known from the prior art is that the measurements which are performed are sometimes subject to severe fluctuations in the conditions of measurement, and it is therefore possible to predict the occurrence of an icing event in the compressor and to take measures to counteract it only with insufficient accuracy.

It is therefore an object of the present invention to propose a gas turbine and a method for operating said gas turbine which can avoid these disadvantages known from the prior art. In particular, the gas turbine and the associated method should allow very accurate determination of the icing point during operation, thus enabling suitable countermeasures to be taken with sufficient reliability.

This object is achieved by means of a gas turbine and by a method as claimed. Advantageous developments of the invention are indicated in the dependent claims and described in the description.

The gas turbine according to the invention comprises an intake section and a compressor having a compressor flow duct. The compressor furthermore has an inlet guide blade row with adjustable inlet guide blades, which is positioned in the compressor flow duct. According to the invention, the gas turbine has an icing sensor unit comprising at least one sensor arranged between a first compressor rotor blade row and a first compressor guide blade row. Here, the first compressor rotor blade row is arranged immediately downstream of the inlet guide blade row and the first compressor guide blade row is arranged immediately downstream of the first compressor rotor blade row in the compressor flow duct. The icing sensor unit furthermore has at least one air humidity sensor and, in addition, at least one pressure sensor and one temperature sensor, which are both arranged between the first compressor rotor blade row and the first compressor guide blade row.

This arrangement advantageously makes it possible to determine imminent icing. With the information on imminent icing, the adjustable inlet guide blades of the inlet guide blade row can be set to counteract this icing. This is the intention in the method according to the invention for operating the gas turbine.

The positioning according to the invention of the sensors between the first compressor rotor blade row and the first compressor guide blade row advantageously makes it possible to acquire data at the point in the compressor flow duct at which the static temperature is lowest and hence the risk of icing is greatest.

From the data for the air humidity and the temperature and the pressure, in particular the static wall pressure, it is possible to determine the risk of icing. Here, the sensors for temperature and pressure determination are positioned at the location in the compressor flow duct at which the lowest temperatures and the lowest static wall pressures are to be expected.

In an advantageous embodiment of the gas turbine according to the invention, the air humidity sensor is arranged in the intake section to enable measurement of the air humidity to take place close to the apparatus.

In another advantageous embodiment of the gas turbine according to the invention, the icing sensor unit comprises a plurality of pressure sensors arranged in a manner distributed along a circumference between the first compressor rotor blade row and the first compressor guide blade row in the compressor flow duct. Here, the pressure sensors are spaced apart uniformly, for example.

This enables a value for the static wall pressure to be determined at several points. More accurate and more reliable measurement is therefore possible. Moreover, failure of one pressure sensor can be compensated for by the redundancy.

In another advantageous embodiment of the gas turbine according to the invention, the icing sensor unit has a plurality of temperature sensors arranged in a manner distributed along a circumference between the first compressor rotor blade row and the first compressor guide blade row in the compressor flow duct. Here, the temperature sensors are spaced apart uniformly, for example.

This enables a value for the temperature to be determined at several points. More accurate and more reliable measurement is therefore possible. Moreover, failure of one temperature sensor can be compensated for by the redundancy.

In the method according to the invention for adjusting a gas turbine while in operation, said turbine accelerating an intake air mass flow within a compressor flow duct, in a first step an air humidity determination is performed in a compressor inlet region and/or in the compressor flow duct, as are a pressure determination in the compressor flow duct and a temperature determination in the compressor flow duct. In a second step, an icing risk determination is performed. In a third step, a blade adjustment then takes place in such a way that, when there is a risk of icing, at least inlet guide blades of an inlet guide blade row are set in such a way that the acceleration of the intake air mass flow is reduced. In the method according to the invention, the pressure determination and the temperature determination take place between the first compressor rotor blade row and the first compressor guide blade row.

By means of the method according to the invention, it is advantageously possible to prevent icing, or the gas turbine can be operated closer to the icing limit. As a result, there is a wider useful range of adjustment of the variable inlet guide blades available for the operation of the gas turbine. More efficient operation of the gas turbine is thus possible in comparison with conventional procedures.

In an advantageous embodiment of the method according to the invention, the air humidity determination takes place in the compressor inlet region.

In this region, the speed of flow of the air mass flow is lower than in the compressor flow duct. Air humidity measurement can therefore be performed more favorably in this region.

In another advantageous embodiment of the method according to the invention, in the air humidity determination and/or the pressure determination and/or the temperature determination, determination takes place from measured values of a plurality of sensors.

A larger region of the compressor flow duct is thereby monitored. By means of this measure, the method gains in accuracy and reliability.

BRIEF DESCRIPTION OF THE DRAWINGS

Illustrative embodiments of the invention are explained in greater detail by means of the drawings and the following description. In the drawings:
FIG. 2 shows a compressor of the gas turbine according to the invention,
and
FIG. 3 shows a method according to the invention for adjusting the gas turbine.

DETAILED DESCRIPTION OF INVENTION

Figure 1:
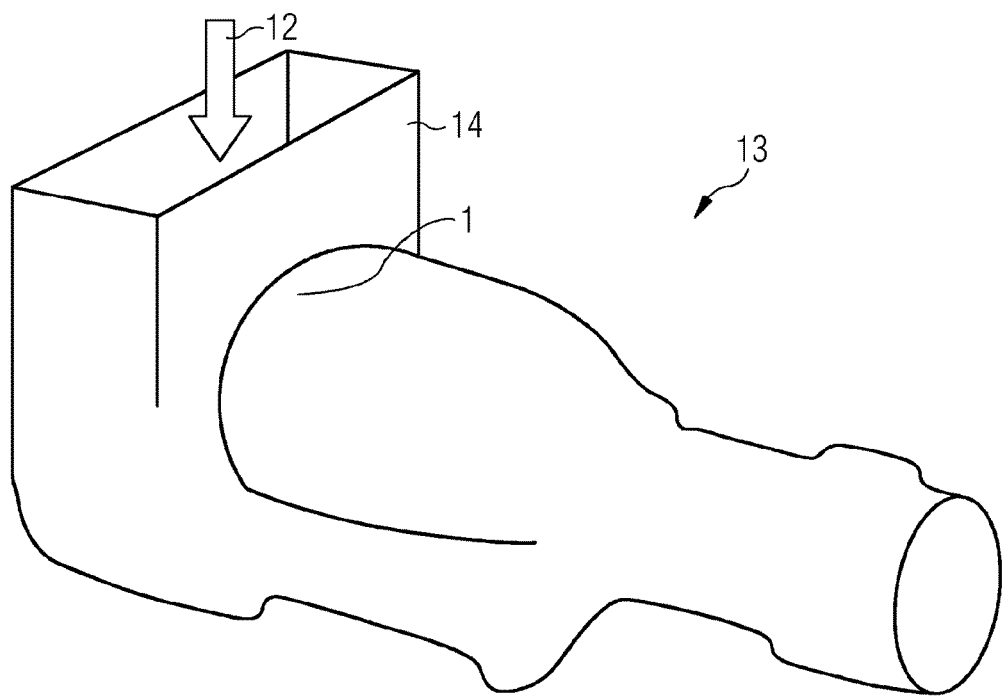
FIG. 1 shows a gas turbine according to the invention.

FIG. 1 shows a gas turbine 13 according to the invention by way of example in a diagram. The gas turbine according to the invention has an intake section 14 for feeding in supply air. Here, the supply air enters a compressor inlet region 2 (not shown specifically in FIG. 1) of the gas turbine 13 in an intake air mass flow 12. The compressor 1 is arranged downstream of the intake section 14. As is customary with gas turbines, a combustion chamber (not shown specifically here) is arranged downstream of the compressor, and a turbine is positioned downstream of this combustion chamber.

The compressor 1 of the gas turbine 13 according to the invention is depicted by way of example in a sectional view in FIG. 2.

The compressor inlet region 2 is situated in the intake section 14. At least one air humidity sensor 11 for measuring air humidity is arranged in the intake section 14, for example. The air humidity sensor 11 is a part according to the invention of an icing sensor unit 17. As an alternative, the air humidity sensor 11 can also be arranged outside the intake section 14, e.g. ahead of air inlet filters of the system or in an adjacent weather station. Moreover, at least one inlet pressure sensor 9 and one inlet temperature sensor 10 can be placed in the intake section 14.

The compressor 1 is arranged downstream of the compressor inlet region 2. According to the invention, the compressor has an inlet guide blade row 3 comprising inlet guide blades. The first compressor rotor blade row 5 comprising compressor rotor blades is arranged downstream of the inlet guide blade row 3. A first compressor guide blade row 6 comprising compressor guide blades is arranged downstream of the first compressor rotor blade row 5. The first compressor rotor blade row 5 and the first compressor guide blade row 6 are situated in a compressor flow duct 4.

All the blades of a blade row are arranged in a manner uniformly distributed along the circumference at the same point in the compressor flow duct 4. They are situated in a row. The blades of the compressor rotor blade row 5 are secured on a shaft 15. The blades of the compressor guide blade row 6 are secured on a duct wall 16 of the compressor flow duct 4. Further rows of blades (not shown specifically here) can be arranged downstream of the sets 5, 6 of blades shown.

According to the invention, at least the inlet guide blades can have an adjustable angle of incidence. Further guide blade rows can also be adjustable. The adjustability of the angle of incidence of the inlet guide blades makes it possible to vary the intake air mass flow 12 and hence to keep a maximum permissible turbine outlet temperature constant over a wide part-load range.

According to the invention, further parts of the icing sensor unit 17 are arranged in the compressor flow duct 4. At least one pressure sensor 7 and one temperature sensor 8 are arranged in the compressor flow duct 4. Here, the pressure sensor 7 is a sensor for the static wall pressure. In particular, the at least one pressure sensor 7 and the at least one temperature sensor 8 are arranged downstream of the first compressor rotor blade row 5. In particular, it is also possible for a plurality of pressure and/or temperature sensors 7 and 8 to be arranged, in particular in a manner distributed along a circumference.

A method 18 according to the invention for adjusting the gas turbine 13 is depicted by way of example in a flow diagram in FIG. 3. The method 18 relates, in particular, to the setting of the variable inlet guide blade row 3.

At low temperatures and a high air humidity, there is the risk that icing will occur at the forward blade rows in the compressor 1. The inlet guide blade row 3 and the first compressor rotor blade row 5 are the most at risk. The intake air mass flow is intensively cooled by high acceleration of the intake air mass flow 12 downstream of the first compressor rotor blade row 5. Thus, icing could occur even at inlet temperatures of the intake air mass flow 12 above 0° C. The method according to the invention prevents such icing.

In the method 18 according to the invention, an air humidity determination 19 and a pressure determination 20 and a temperature determination 21 are first of all performed by means of the icing sensor unit 17.

The air humidity determination 19 is accomplished with the aid of the at least one air humidity sensor 11. The air humidity is determined 19, in particular, in the compressor inlet region 2, in the intake section 14. As an alternative, determination 19 of the air humidity is also performed outside the intake section 14, e.g. ahead of air inlet filters of the system or in an adjacent weather station. The value determined for the air humidity can be obtained from a number of component values. The component values can come from a plurality of air humidity sensors 11, which are arranged in the compressor flow duct 4. As a value, it is possible to determine 19 the relative air humidity, for example, e.g. by means of the wet bulb temperature method.

The pressure determination 20 is accomplished with the aid of the at least one pressure sensor 7. The pressure is determined 20 in the compressor flow duct 4 of the compressor 1, in particular downstream of the first compressor rotor blade row 5, in particular upstream of the first compressor guide blade row 6. The value determined for the pressure can be obtained from a number of component values. The component values can come from a plurality of pressure sensors 7, which are arranged in the compressor flow duct 4, in particular along a circumference. In the pressure determination 20, the static wall pressure is determined, in particular.

The temperature determination 21 is accomplished with the aid of the at least one temperature sensor 8. The temperature is determined 21 in the compressor flow duct 4 of the compressor 1, in particular downstream of the first compressor rotor blade row 5, in particular upstream of the first compressor guide blade row 6. The value determined for the temperature can be obtained from a number of component values. The component values can come from a plurality of temperature sensors 8, which are arranged in the compressor flow duct 4, in particular radially in a row.

Downstream of the first compressor rotor blade row 5, where the intake air mass flow 12 is accelerated very quickly, the conditions for icing are very favorable in comparison with other points in the compressor flow duct 4. The lowest temperature and the lowest static pressure are to be expected downstream of the first compressor rotor blade row 5.

From the values obtained for the air humidity of the air in the compressor inlet region 2, for the static wall pressure and the temperature in the compressor flow duct 4, a risk of icing is determined 22 according to the invention in the next step of the method. The risk of icing is determined 22, in particular, by determining the dew point spread. Here, the dew point spread is a difference between the temperature determined and a sublimation temperature determined by calculation. In general, the risk of icing increases with decreasing temperature, falling pressure and rising air humidity.

Depending on the risk of icing determined 22, blade setting 23 is then performed according to the invention in the next step. If the gas turbine 13 approaches the icing point during operation, the blades, in particular those in the inlet guide blade row 3, are set in such a way that the intake air mass flow 12 is accelerated less strongly. Here, blade adjustment is initiated especially if the dew point spread falls below a predefined safety value. According to the invention, the minimum position of the inlet guide blade row 3 possible without icing occurring is set. The useful adjustment range of the inlet guide blades of the inlet guide blade row 3 at low temperatures and high air humidity is thereby increased.

The method 18 according to the invention is advantageously carried out at regular intervals during the operation of the gas turbine. The method 18 is subjected to open-loop and/or closed-loop control, in particular by a control unit (not shown specifically here). In particular, this control unit can be a main control unit of the gas turbine.

Although the invention has been illustrated and described more specifically in detail by means of the illustrative embodiment, the invention is not restricted by the examples disclosed, and other variations can be derived therefrom by a person skilled in the art without exceeding the scope of protection of the invention.

The invention claimed is:

1. A gas turbine comprising an intake section and a compressor having a compressor flow duct, wherein the compressor has an inlet guide blade row with adjustable inlet guide blades, which is positioned in the compressor flow duct, the gas turbine comprising:
   an icing sensor unit arranged between a first compressor rotor blade row and a first compressor guide blade row, wherein the first compressor rotor blade row is arranged immediately downstream of the inlet guide blade row and the first compressor guide blade row is arranged immediately downstream of the first compressor rotor blade row in the compressor flow duct,
   wherein the icing sensor unit has at least one air humidity sensor, and
   in addition, the icing sensor unit having at least one pressure sensor and one temperature sensor, which are both arranged between the first compressor rotor blade row and the first compressor guide blade row.

2. The gas turbine as claimed in 1, wherein the air humidity sensor is arranged in the intake section.

3. The gas turbine as claimed in claim 1,
   wherein the icing sensor unit has a plurality of pressure sensors arranged in a manner distributed along a circumference between the first compressor rotor blade row and the first compressor guide blade row in the compressor flow duct.

4. The gas turbine as claimed in claim 1,
   wherein the icing sensor unit has a plurality of temperature sensors arranged in a manner distributed along a circumference between the first compressor rotor blade row and the first compressor guide blade row in the compressor flow duct.

5. A method for operating a gas turbine, which accelerates an intake air mass flow within a compressor flow duct of a compressor, comprising:
   in a first step, an air humidity determination takes place in a compressor inlet region and/or in the compressor flow duct, and a pressure determination takes place in the compressor flow duct between a first compressor rotor blade row and a first compressor guide blade row, and a temperature determination takes place in the compressor flow duct, between the first compressor rotor blade row and the first compressor guide blade row, in a second step, an icing risk determination is performed, and in a third step, a blade adjustment takes place such that, when there is a risk of icing, at least inlet guide blades of an inlet guide blade row are set such that the acceleration of the intake air mass flow is reduced and the icing of the compressor is thereby avoided.

6. The method as claimed in claim 5, wherein the air humidity determination takes place in a compressor inlet region.

7. The method as claimed in claim 5, wherein, in the air humidity determination and/or the pressure determination and/or the temperature determination, determination takes place from measured values of a plurality of sensors.

\* \* \* \* \*